April 22, 1952   W. S. DIEHL   2,593,420
VARIABLE AREA NOZZLE
Filed May 28, 1946

INVENTOR.
WALTER S. DIEHL
BY
Walter S. Paul.
ATTORNEY

Patented Apr. 22, 1952

2,593,420

UNITED STATES PATENT OFFICE 2,593,420

VARIABLE AREA NOZZLE

Walter S. Diehl, United States Navy

Application May 28, 1946, Serial No. 672,904

3 Claims. (Cl. 60—35.55)

(Granted under the act of March 3, 1883, as amended April 30, 1928; 370 O. G. 757)

This invention relates to nozzles and more particularly to nozzles equipped with means for varying the effective outlet areas thereof.

Nozzles constructed in accordance with the present invention find particular application as exhaust nozzles in jet-propulsion aircraft as a means for regulating the thrust produced by engines in such aircraft. It is known that the thrust may be increased or decreased by increasing or decreasing the effective area of the exhaust nozzles and that only relatively small changes in such areas are sufficient to produce considerable variation in thrust. An object of the present invention is, therefore, to provide improved variable area nozzles adapted for use as exhaust nozzles in jet-propulsion aircraft.

Further objects of the invention are to provide improved variable area nozzles of simple mechanical design adaptable to operation by remote control; to provide improved nozzles in which the effective areas may be quickly varied by a simple mechanical operation; and to provide for carrying out the foregoing objects in a facile, economical and efficient manner.

In accomplishing these and other objects of the present invention, I have provided improved details of structure, preferred forms of which are shown in the accompanying drawing, wherein Fig. 1 is a perspective view of a nozzle constructed in accordance with the present invention;

Figure 1:
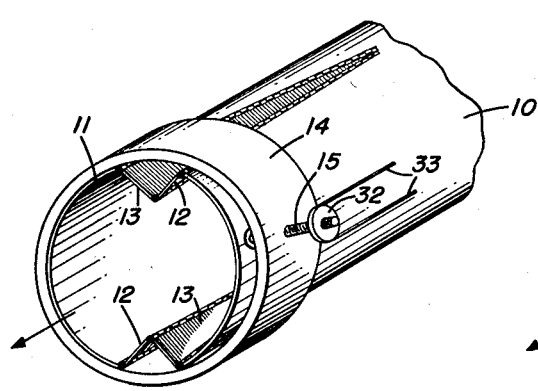
Figure 2:
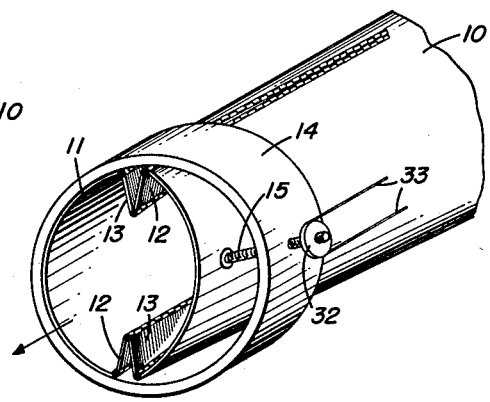
Fig. 2 is a perspective view similar to Fig. 1, but showing the nozzle adjusted to provide a decreased effective outlet area.

Referring more in detail to the drawing:

In Figs. 1 and 2 there is shown at 10 a tubular body member, which may be an exhaust from an engine in a jet-propulsion aircraft or other pipe or conduit adapted to pass fluids. The body member is formed of sheet steel or other elastic material capable of maintaining its shape under conditions of relatively high temperatures and yet flexing readily upon application of force. The body member is designed to act as a nozzle with fluid emerging from the outer end, designated 11, in the direction indicated by the arrow.

In order to render the area of the nozzle variable, the body member is bifurcated, having triangular sections cut out therefrom, preferably on diametrically opposite sides, and extending inwardly from the end 11. Pairs of triangularly shaped gores 12 and 13 are hinged together and hinged to the bifurcations or flaps of the body member and protrude within the mid-portion of said member.

It is apparent that the flaps or bifurcations of the body member may be transversely compressed, flexing with respect to the body member, and that the outlet area of the nozzle is thereby decreased, such being the position illustrated in Fig. 2. Due to the elasticity of the material of which the body member is formed, the nozzle tends to spring open to the position illustrated in Fig. 1 when the compressive force is removed.

One form of operating mechanism is illustrated in Figs. 1 and 2. Such mechanism comprises an annular ring 14 fixed to one of the flaps or bifurcations of the body member. The other bifurcation is free within the ring. A shaft 15 is threadedly engaged through a radial bore in the ring adjacent the free bifurcation, and the inner end of said shaft bears against said free bifurcation. A pulley 32 on shaft 15, with cable 33 is one means of rotating the shaft to compress the flaps to the position shown in Figs. 2 and 5.

It is seen that the flaps may be compressed by rotating the shaft 15 inwardly and expanded by rotating said shaft outwardly. Such rotation may be effected by a suitable remote control mechanism when desired, as when the nozzle is employed in an aircraft.

Figure 3:
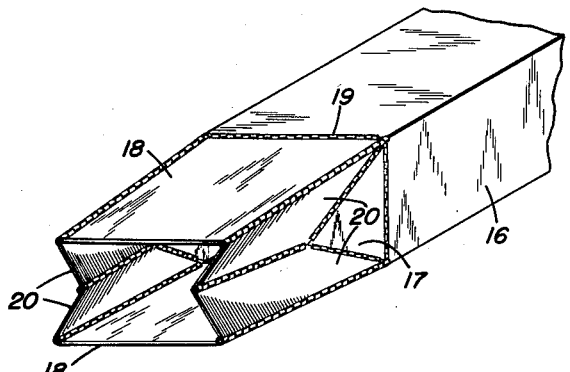
Fig. 3 is a perspective view of a modified form of nozzle embodying the features of the present invention.
Figure 4:
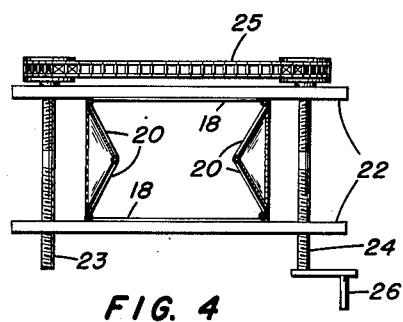
Fig. 4 is an end elevational view showing an operating mechanism suitable for use with the nozzle shown in Fig. 3.

In the form of nozzle assembly illustrated in Figs. 3 and 4, the body member is rectangular in cross-section and the nozzle is in the form of a collapsible box-like structure.

Opposite sides of the body member 16 are extended, as indicated at 17, to form pointed triangularly shaped flaps. Movable flaps 18 are hinged to the opposite side of body member 16, as indicated at 19. Inner gores 20 are hinged to the flaps 17 and to the flaps 18 to complete the box-like nozzle structure.

Figure 5:
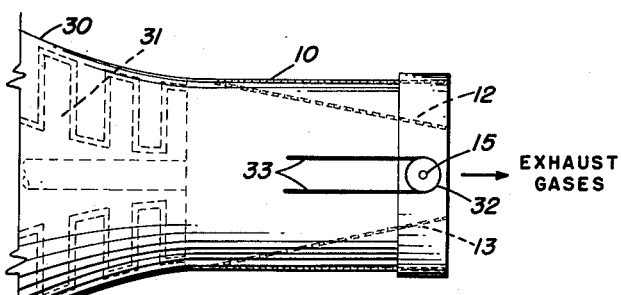
Fig. 5 is a fragmentary view in section of a portion of a jet engine showing the exhaust nozzle of the embodiment of Figs. 1 and 2.

It is seen that the effective area of the nozzle may be increased or decreased by opening or closing the flaps 18. One form of mechanism for operating these flaps is illustrated in Fig. 4. Such mechanism comprises a pair of bars 22 fixed to the flaps 18 and connected by a pair of threaded spindles 23 and 24. The latter are threaded from adjacent opposite ends with right and left screw threads in such manner that rotation thereof increases or decreases the spacing between the bars 22 and consequently the opening between the flaps 18. Preferably the spindles 23 and 24 are connected by a sprocket and chain mechanism 25 or other suitable means for transmitting rotation, whereby rotation of either of the spindles is transmitted to the other. In Fig. 5, the exhaust nozzle 10 of the embodiment shown in Figs. 1 and 2 is shown secured to the end of jet engine 30 aft of the turbine blades 31.

Any suitable means may be provided for rotating the spindles. When direct operation is desired, such means may comprise a crank 26 secured to one of the spindles, as illustrated in Fig. 4. When operation by remote control is desired, any suitable form of remote control mechanism may be provided.

While I have shown but certain forms of the present invention, it is apparent that the structure may be varied without departing from the spirit of the invention. Therefore, I do not wish to be limited by the disclosure set forth, but only by the scope of the appended claims.

The invention described herein may be manufactured and used by or for the Government of the United States of America for governmental purposes without payment of any royalties thereon or therefor.

What is claimed is:

1. In an exhaust nozzle assembly of a jet propulsion engine, a variable area exhaust nozzle comprising a walled conduit of flexible sheet metal for the conduction of exhaust gases from said engine to atmosphere, a pair of inwardly hinged gores in opposite sides of the wall of said conduit, said gores biased to be normally in unflattened condition, and conduit - collapsing means including a frame around said conduit and screw-threaded means associated with said frame operable at substantially a right angle to the plane of said gores to collapse said conduit by flattening said gores thereby reducing the cross-sectional area of said nozzle.

2. In an exhaust nozzle assembly of a jet propulsion engine, a variable area tail cone comprising a walled conduit of flexible sheet metal for the conduction of exhaust gases from said engine to atmosphere, at least one pair of inwardly hinged gores in the walls of said conduit, said gores biased to be normally in unflattened condition, and conduit-collapsing means including at least one screw-threaded member bearing at its end on one side of said conduit at substantially a right angle to said gores and threadedly engageable with a member of a frame surrounding said conduit coacting therewith to adjustably compress said conduit by flattening said gores thereby reducing the cross-sectional area of said tail cone.

3. In an exhaust nozzle assembly of a jet propulsion engine, a variable area exhaust nozzle comprising a walled conduit of flexible sheet metal for the conduction of exhaust gases from said engine to the atmosphere, a pair of inwardly hinged gores in opposite walls or said conduit, said gores biased to be normally in unflattened condition, and conduit-collapsing means including a two-part box frame around said conduit and screw-threaded means adjustably operable in at least one threaded hole in said frame to move the two parts of said frame together at substantially a right angle to the plane of said gores thereby flattening said gores and reducing the cross-sectional area of said nozzle.

WALTER S. DIEHL.

REFERENCES CITED

The following references are of record in the file of this patent:

UNITED STATES PATENTS

| Number | Name | Date |
| --- | --- | --- |
| 134,469 | Day | Dec. 31, 1872 |
| 186,310 | Curtis | Jan. 16, 1877 |
| 577,362 | Ettlinger | Feb. 16, 1897 |
| 591,067 | Wallace | Oct. 5, 1897 |
| 930,095 | Seagrave | Aug. 3, 1909 |
| 1,185,970 | Bower | June 6, 1916 |
| 1,306,913 | Kitchen | June 17, 1919 |
| 2,280,835 | Lysholm | Apr. 28, 1942 |
| 2,300,679 | Klein | Nov. 3, 1942 |
| 2,342,262 | Franz | Feb. 22, 1944 |
| 2,409,433 | Hunter | Oct. 15, 1946 |
| 2,420,323 | Meyer | May 13, 1947 |

FOREIGN PATENTS

| Number | Country | Date |
| --- | --- | --- |
| 94,376 | Germany | Nov. 13, 1897 |